(12) United States Patent
Knapp, Jr. et al.

(10) Patent No.: US 7,435,399 B2
(45) Date of Patent: Oct. 14, 2008

(54) CHROMATOGRAPHIC EXTRACTION WITH DI(2-ETHYLHEXYL)ORTHOPHOSPHORIC ACID FOR PRODUCTION AND PURIFICATION OF PROMETHIUM-147

(75) Inventors: Furn F Knapp, Jr., Oak Ridge, TN (US); Rose A Boll, Knoxville, TN (US); Saed Mirzadeh, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 273 days.

(21) Appl. No.: 11/530,207

(22) Filed: Sep. 8, 2006

(65) Prior Publication Data

US 2008/0060998 A1 Mar. 13, 2008

(51) Int. Cl.
*C22B 59/00* (2006.01)
(52) U.S. Cl. .......................... 423/2; 423/21.1; 423/21.5
(58) Field of Classification Search ............... 423/2, 423/21.1, 21.5; 210/198.2, 635, 656
See application file for complete search history.

(56) References Cited

U.S. PATENT DOCUMENTS

| | | | | |
|---|---|---|---|---|
| 3,004,823 | A | * | 10/1961 | Peppard et al. ............... 423/10 |
| 5,186,913 | A | | 2/1993 | Knapp, Jr. et al. |
| 5,275,802 | A | | 1/1994 | Knapp, Jr. et al. |
| 6,716,353 | B1 | | 4/2004 | Mirzadeh et al. |
| 6,751,280 | B2 | | 6/2004 | Mirzadeh et al. |
| 6,804,319 | B1 | | 10/2004 | Mirzadeh et al. |

* cited by examiner

*Primary Examiner*—Steven Bos
(74) *Attorney, Agent, or Firm*—Joseph A. Marasco

(57) ABSTRACT

A method of producing and purifying promethium-147 including the steps of: irradiating a target material including neodymium-146 with neutrons to produce promethium-147 within the irradiated target material; dissolving the irradiated target material to form an acidic solution; loading the acidic solution onto a chromatographic separation apparatus containing HDEHP; and eluting the apparatus to chromatographically separate the promethium-147 from the neodymium-146.

10 Claims, 10 Drawing Sheets

CHROMATOGRAPHIC EXTRACTION WITH DI(2-ETHYLHEXYL)ORTHOPHOSPHORIC ACID FOR PRODUCTION AND PURIFICATION OF PROMETHIUM-147

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

BACKGROUND OF THE INVENTION

Promethium-147 (also written as Pm-147, $^{147}$Pm) has been of commercial and research interest for many years for use as a beta source for thickness gauges or for luminescence devices to produce light, such as watches, signs, etc. Promethium-147 decays with beta minus ($\beta^-$) process with a half-life of 2.6 years to the stable samarium-147 (Sm-147). In 99.994% of time, promethium-147 decay feeds to the ground state of Sm-147 and, consequently, the decay of promethium-147 is followed by emission of an extremely week gamma-ray at 121 keV with an intensity of only 0.00285%. The maximum energy of the $\beta^-$ particles from promethium is 224.5 keV, with an average energy of ~62 keV.

Light produced from luminescence devices using promethium-147 is used for visual devices and to produce signals which required dependable operation. Such technology has been used for nuclear powered batteries by capturing light in photocells which convert the energy into an electric current. Promethium-147 batteries have a useful shelf life of about five years. Promethium-147 also shows promise as a heat source and auxiliary power source for satellites and space probes. Conventionally, promethium-147 has been isolated in large amounts from uranium-235 fission products. Until the 1970's, Oak Ridge National laboratory (ORNL) had a large inventory of about 853 grams of promethium-147 which had been isolated from fission products at the Hanford, Wash., nuclear facility. Fission products are no longer processed in the U.S. because such processing is exceptionally expensive and produces very high levels of long-lived radioactive wastes. The ORNL inventory has long been exhausted, and there is currently no domestic source of significant amounts of promethium-147. There is therefore a need for a promethium-147, but from a different, available, environmentally safer source; the present invention addresses that need.

BRIEF SUMMARY OF THE INVENTION

In accordance with one aspect of the present invention, the foregoing and other objects are achieved by a method of producing and purifying promethium-147 that includes the steps of: irradiating a target material including neodymium-146 with neutrons to produce promethium-147 within the irradiated target material; dissolving the irradiated target material to form an acidic solution; loading the acidic solution onto an extraction chromatographic separation apparatus containing di(2-ethylhexyl)orthophosphoric acid (HDEHP) impregnated solid support; and eluting the apparatus to chromatographically separate the promethium-147 from the neodymium-146.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1:
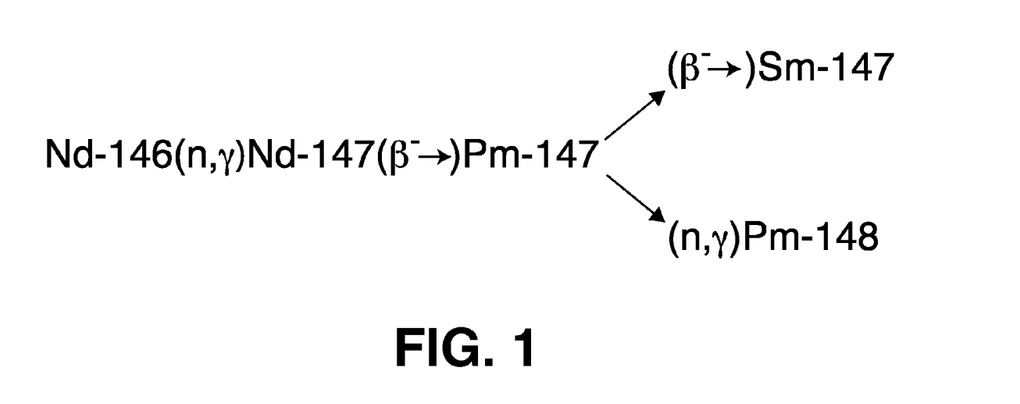
FIG. 1 is an illustration of chemical formulae for production and decay of radioactive isotopes of promethium from neodymium-146.

The production of promethium-147 by neutron irradiation of neodymium, preferably enriched neodymium-146 (also written as Nd-146, $^{146}$Nd), has been realized for a number of years, but the availability of promethium-147 purified from the neodymium-146 target material has not heretofore been practically possible using column chromatography and required development and demonstration of a convenient and practical method that can be used on the production level. A simplified summary of the principle neutron capture and decay routes relevant to the present invention is illustrated in FIG. 1 and described hereinbelow below.

Irradiation of Enriched Neodymium-146 Targets

Figure 2A:
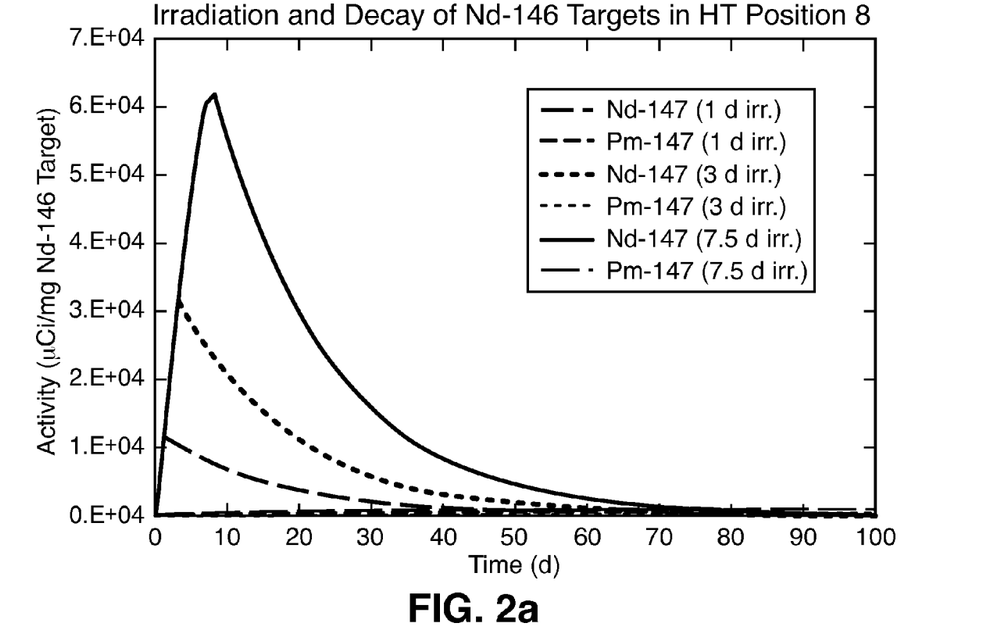
FIG. 2a is a graph showing calculated ORNL High Flux Isotope Reactor (HFIR) production of neodymium-146.
Figure 2B:
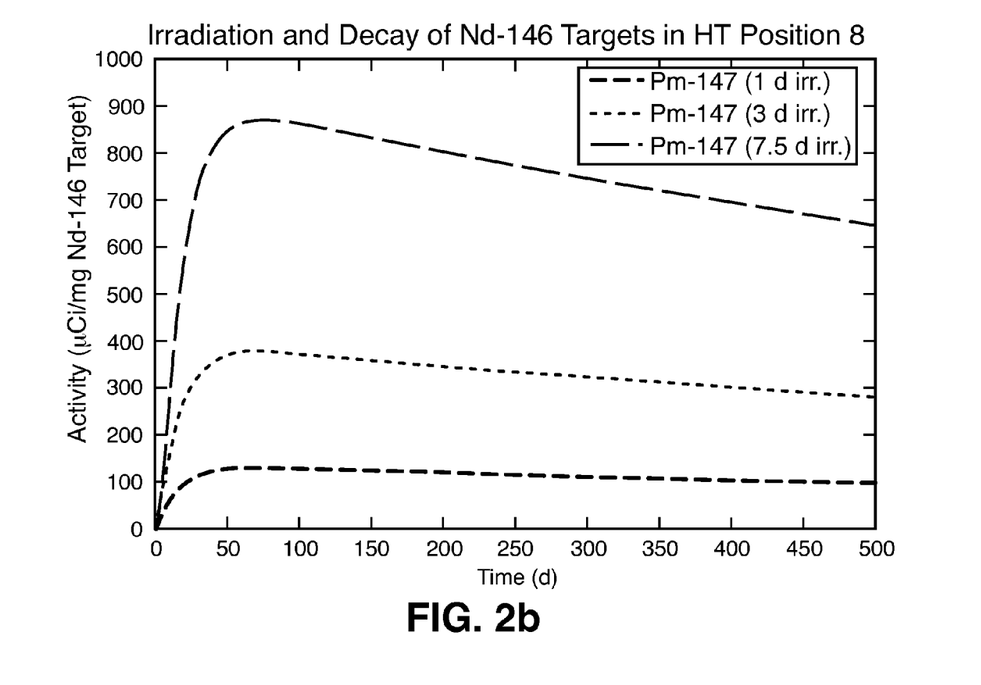
FIG. 2b is a re-scaled version of the graph shown in FIG. 2a to better show constituents of lower activity.

Based on published neutron cross section values, the projected production of promethium-147 via irradiation of enriched neodymium-146 targets in the Peripheral Target Positions (PTP) of the ORNL High Flux Isotope reactor (HFIR), for example, is shown in FIGS. 2a and 2b. These data illustrate that promethium-147 of approximately 1 Ci per gram of enriched neodymium-146 can be produced during a one Cycle HFIR irradiation. These estimates were based on the irradiation at PTP positions (having a peak thermal neutron flux of about 1.3×10 Exp 15 neutrons/cm2/sec) because of availability of relatively large target volumes in these positions, which is essential for production of commercially significant quantities of promethium-147. Because of the projected modest production yields and the large amounts of enriched neodymium-146 target material required for the production of multi-Curie levels of promethium-147, the use of reactors with limited target volume are impractical for the production of multi Curie levels of promethium-147. Table 1 summarizes the radionuclide properties of the key radioisotopes of consideration for the production route described herein.

TABLE 1

| Isotope | Half-Life | Gamma Photons Energy (keV) | Intensity (%) | Average Beta Energy (keV) | Decay Product |
|---|---|---|---|---|---|
| Nd-147 | 10.98 days | 91 | 28 | 233 | Pm-147 |
|  |  | 531 | 13 |  |  |
| Pm-147 | 2.62 years | 121 | 0.00285 | 62 | Sm-147 (Stable) |
| Pm-148 | 41.3 days | 288 | 12.5 | 149 | Sm-148 (Stable) |
|  |  | 414 | 18.7 |  |  |
|  |  | 550 | 18.7 |  |  |

Pm-147 emits extremely weak gamma photons, therefore gamma-ray spectroscopy cannot be used to readily directly detect the presence of promethium-147 during chemical processing. Ubiquitous presence of promethium-148 radioisotope—formed by subsequent neutron capture of promethium-147—was found a convenient means for quantifying the promethium radioisotope during the chemical processing and separation from neodymium and other radionuclide impurities. The 41.3-day half-life of promethium-148 and emission of abundant gamma photons allowed sufficient time to perform high-precision column separation experiments over a period of several months.

EXAMPLE I

Enriched neodymium-146 (97.46%; Batch #161701 from ORNL Inventory, as neodymium$_2$O$_3$) was encapsulated in high purity synthetic quartz tubes and the aluminum HT targets were prepared and tested as described in Nuclear Medicine Procedures #49 and #52 and then irradiated in the hydraulic tube (HT) facility of the ORNL High Flux Isotope Reactor (HFIR).

Dissolution of Irradiated Targets

Using conventional methods, irradiated targets are dissolved in a strong acid such as concentrated (in the range of 6M to 12 M) HCl and/or HNO$_3$. The strong acid is subsequently evaporated and the residue re-dissolved in a relatively weaker (for example, in the range of 0.01M to 3M) acid solution of, for example, HCl and/or HNO$_3$ in preparation for extraction chromatographic separation. The skilled artisan will recognize that there are various acids and combinations of acids that can be used for metal dissolution in preparation for chromatographic separation.

EXAMPLE II

Following HFIR discharge, the targets described in Example I were transferred to a hot cell and the quartz tubes containing the enriched neodymium-146 target opened and 10 M HCl added to each sample, and following the addition of 1 drop of 8 M nitric acid, the samples were evaporated to dryness and then dissolved in 1 mL of 0.1 M HCl to prepare the three stock solutions. Aliquots of 10 µL of each of these solutions were then analyzed by gamma spectroscopy using a NIST calibrated High Purity Ge (HPGe) crystal detector. Aliquots of these stock solutions were then subsequently used for the column separation experiments described herein. The experimental and theoretical production yields of each target are provided and compared in Table 2 (all irradiations in HFIR HT position #8). Table 3 summarizes the results of gamma-ray spectroscopic analyses of HFIR-irradiated neodymium-146 targets.

TABLE 2

| Nd-146 Target | | | Irradiation Period, T1 (hr) | Post EOB Processing Time, T2 (d) | Pm-147 Yield at Time T2 (µCi/mg of Nd-146 target) | | |
|---|---|---|---|---|---|---|---|
| No. | Nd$_2$O$_3$ (mg) | Nd-146 (mg) | | | Exp. | Theo. | Exp./Theo. |
| 1 | 1.60 | 1.34 | 180.9 | ~420 | 959 | 686 | 1.4 |
| 2 | 1.90 | 1.59 | 72.0 | ~240 | 294 | 340 | 0.87 |
| 3 | 1.60 | 1.34 | 24.0 | ~180 | 123 | 124 | 0.99 |

TABLE 3

| | | Radioactivity (µCi/mg of Nd-146 target) | | |
|---|---|---|---|---|
| Radioisotope | Half-Life | Nd-146 #1 | Nd-146 #2 | Nd-146 #3 |
| Nd-147 | 10.9 days | nd | 1.8 E+4 | 1.4 E+4 |
| Pm-147 | 2.62 years | 1.3 E+3 | 3.5 E+2 | 1.4 E+2 |
| Pm-148 | 41.3 days | 2.7 E+1 | 3.1 | 3.0 E−1 |
| Eu-152 | 13.33 years | nd | 4.9 E−3 | 1.5 E−2 |
| Eu-154 | 8.8 years | 3.5 E−2 | 1.0 E−2 | 4.8 E−3 |
| Eu-155 | 4.68 years | 4.0 E−2 | 1.3 E−2 | 6.9 E−3 |
| Gd-153 | 247 days | 2.9 E−3 | 1.9 E−3 | 2.5 E−3 |
| Ir-192 | 78.8 days | 1.4 E+1 | 1.0 E+1 | 6.6 |
| Co-60 | 5.27 years | 5.0 E−2 | 1.1 E−2 | 3.7 E−3 |

Column Separation of Promethium from Neodymium

The solution containing the dissolved target includes both the neodymium-146 target material and the radioactive promethium products, which must be separated in order to be useful for most applications. It was discovered that the necessary separation can be effected by column chromatography using an extraction resin comprised of di(2-ethylhexyl)orthophosphoric acid (HDEHP) adsorbed on a support material (hereinafter identified simply as HDEHP). HDEHP is commercially available under the trade name "LN Resin" from Eichrom Technologies, Inc., 8205 S. Cass Avenue, Suite 106, Darien, Ill. 60561.

EXAMPLE III

Separation of promethium from the neodymium target and radionuclide impurities was evaluated using Eichrome LN extraction resin. Small samples of the HCl stock solutions were applied to the HDEHP. The separations of promethium from neodymium and other radionuclide impurities by elution with increasing concentrations of HCl evaluated, and results are shown in FIGS. 3, 4, 5, 9, and 10. Moreover, evaluations were also made of the separation of promethium from neodymium using reversed phase column chromatography columns previously treated with buffer solution to approximately pH 4. In these cases, aliquots of the neodymium/Pm fractions from a typical LN column separation were combined with small volumes of nitric acid and hydrogen peroxide and evaporated to dryness, dissolved in 0.6 mL of 0.1 M nitric acid and applied to a cation-exchange column containing BioRad AG50X4 (200-400 mesh, in nitrate form) and eluted with 0.1 M α-hydroxyisobutyric acid (HIBA). Results of these tests are shown in FIGS. 6 and 8.

Table 4 and FIGS. 3-10 summarize the results of tracer-level column separation experiments, and illustrate the unforeseeable operability of the present invention.

TABLE 4

Figure 3:
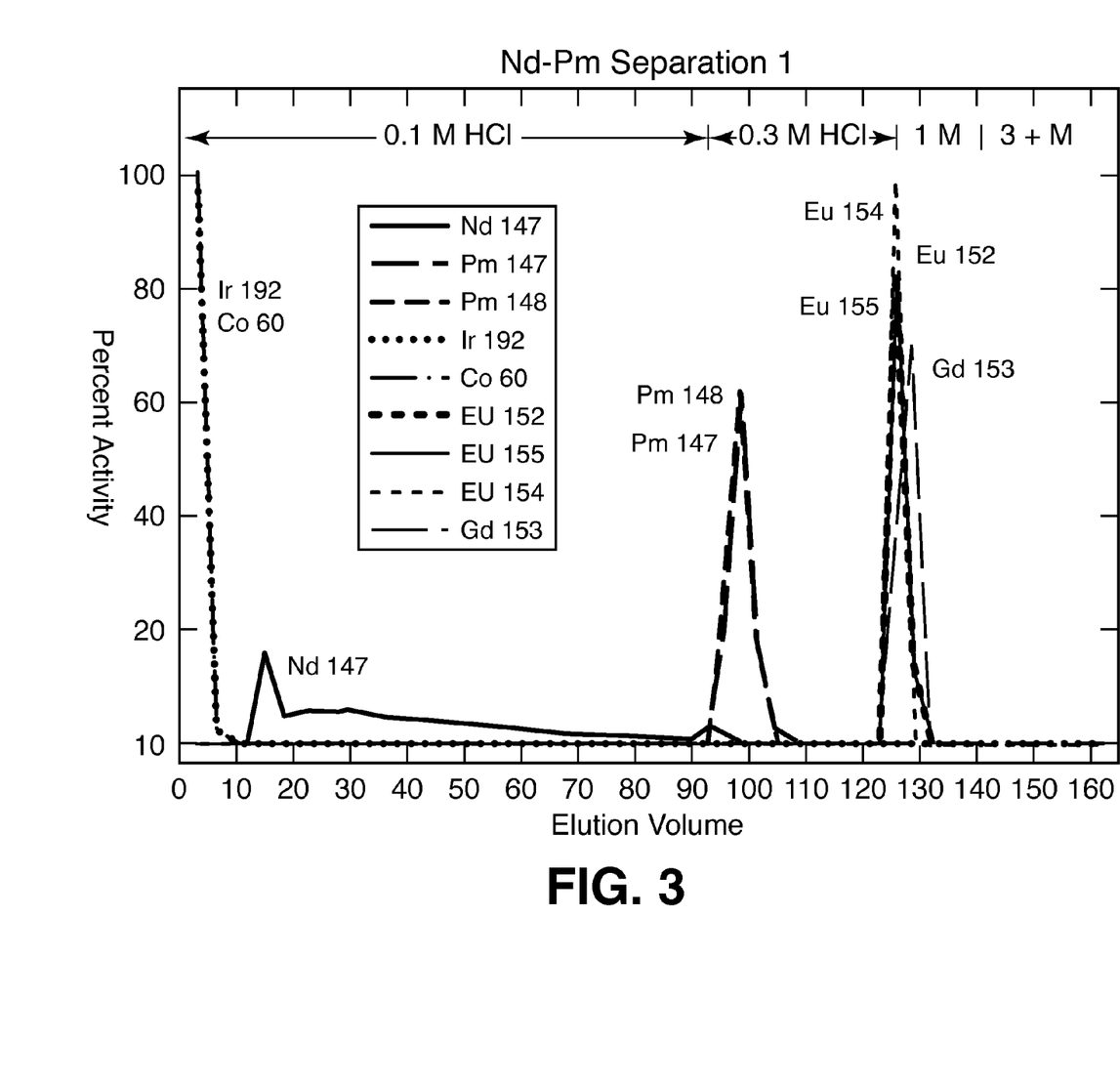
FIG. 3 is a graph showing separation of promethium from neodymium and other radionuclide impurities.
Figure 4:
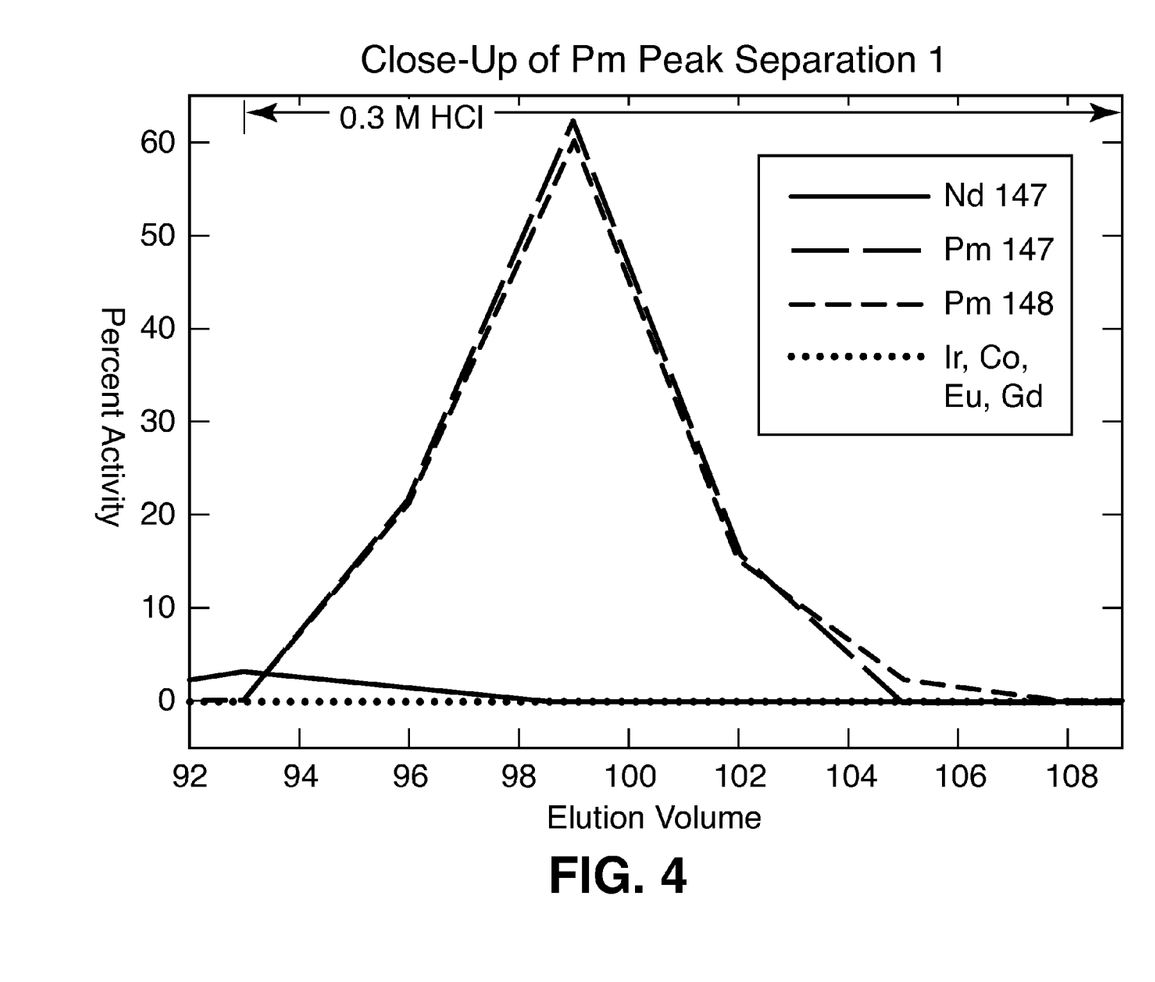
FIG. 4 is a graph showing separation of promethium from neodymium and other radionuclide impurities.
Figure 5:
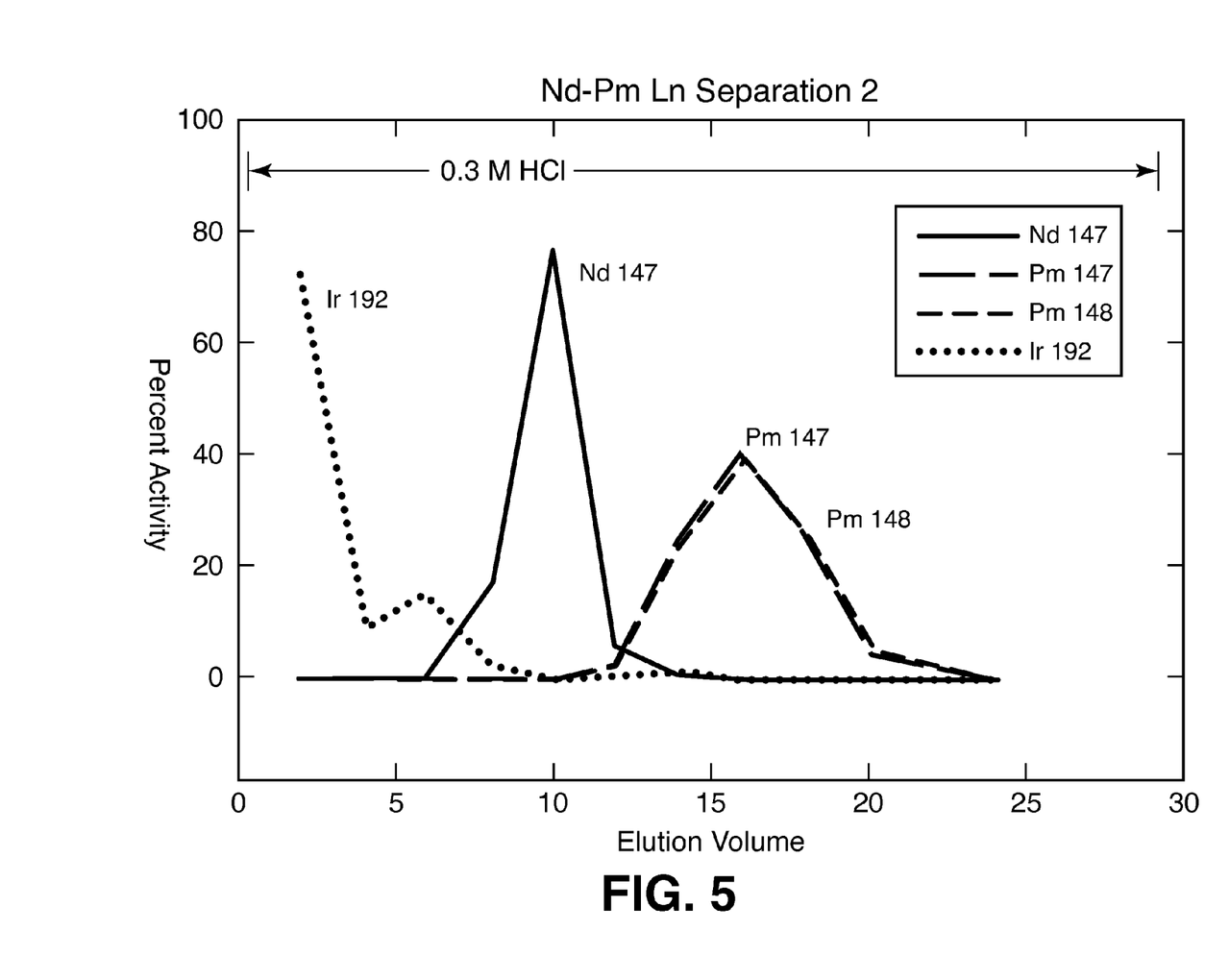
FIG. 5 is a graph showing separation of promethium from neodymium and other radionuclide impurities.
Figure 6:
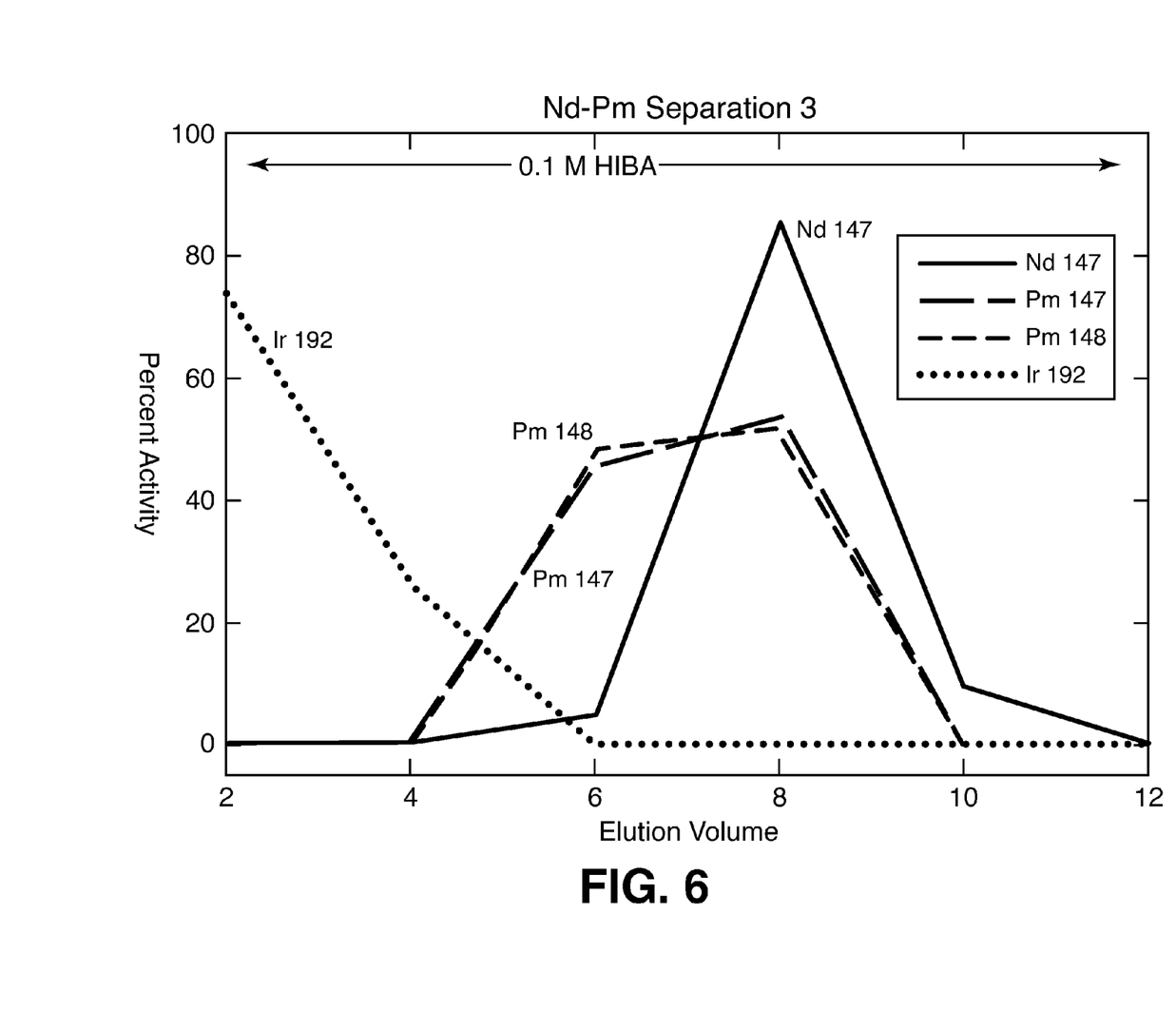
FIG. 6 is a graph showing separation of promethium from neodymium and other radionuclide impurities.
Figure 7:
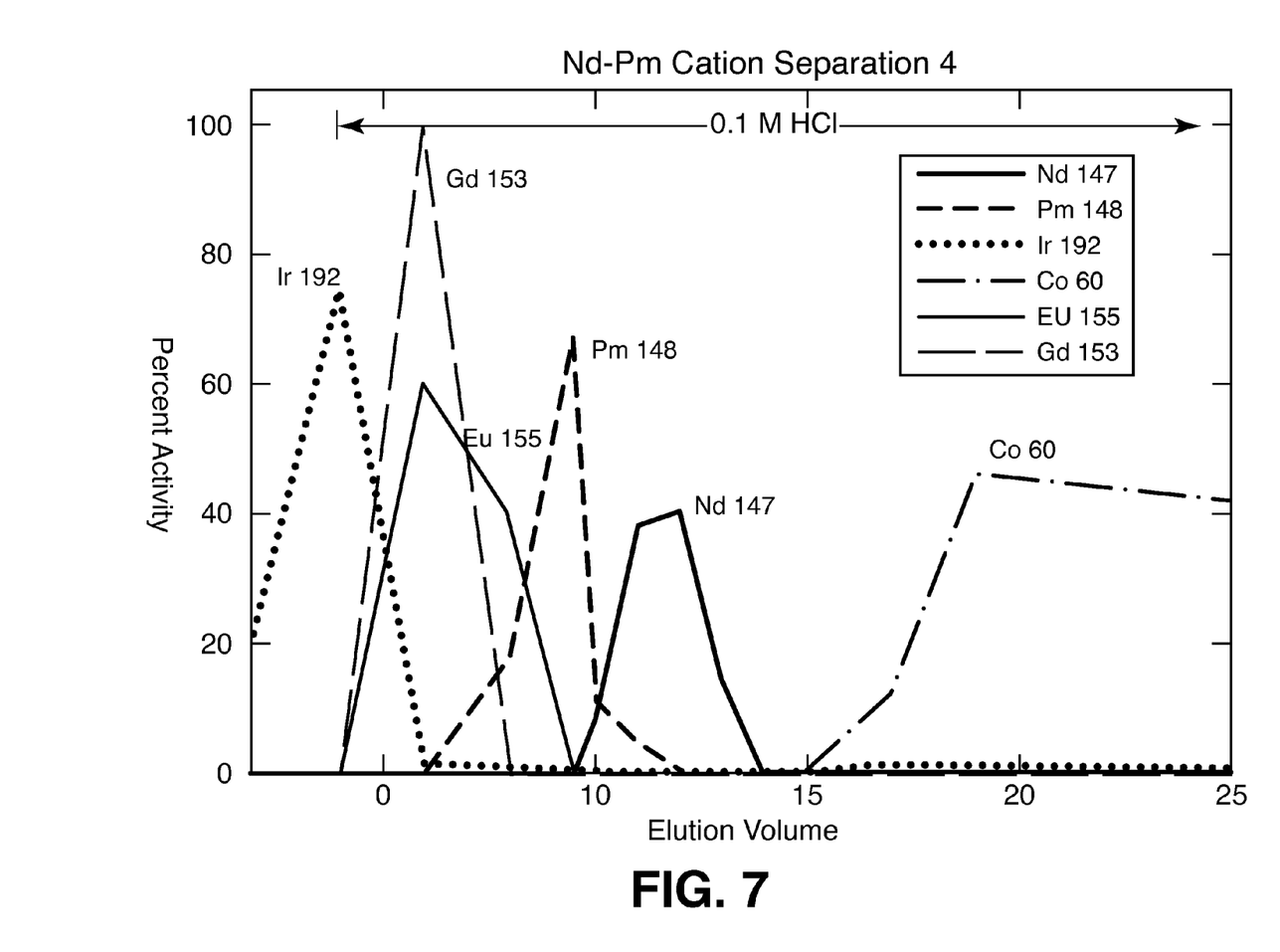
FIG. 7 is a graph showing separation of promethium from neodymium and other radionuclide impurities.
Figure 8:
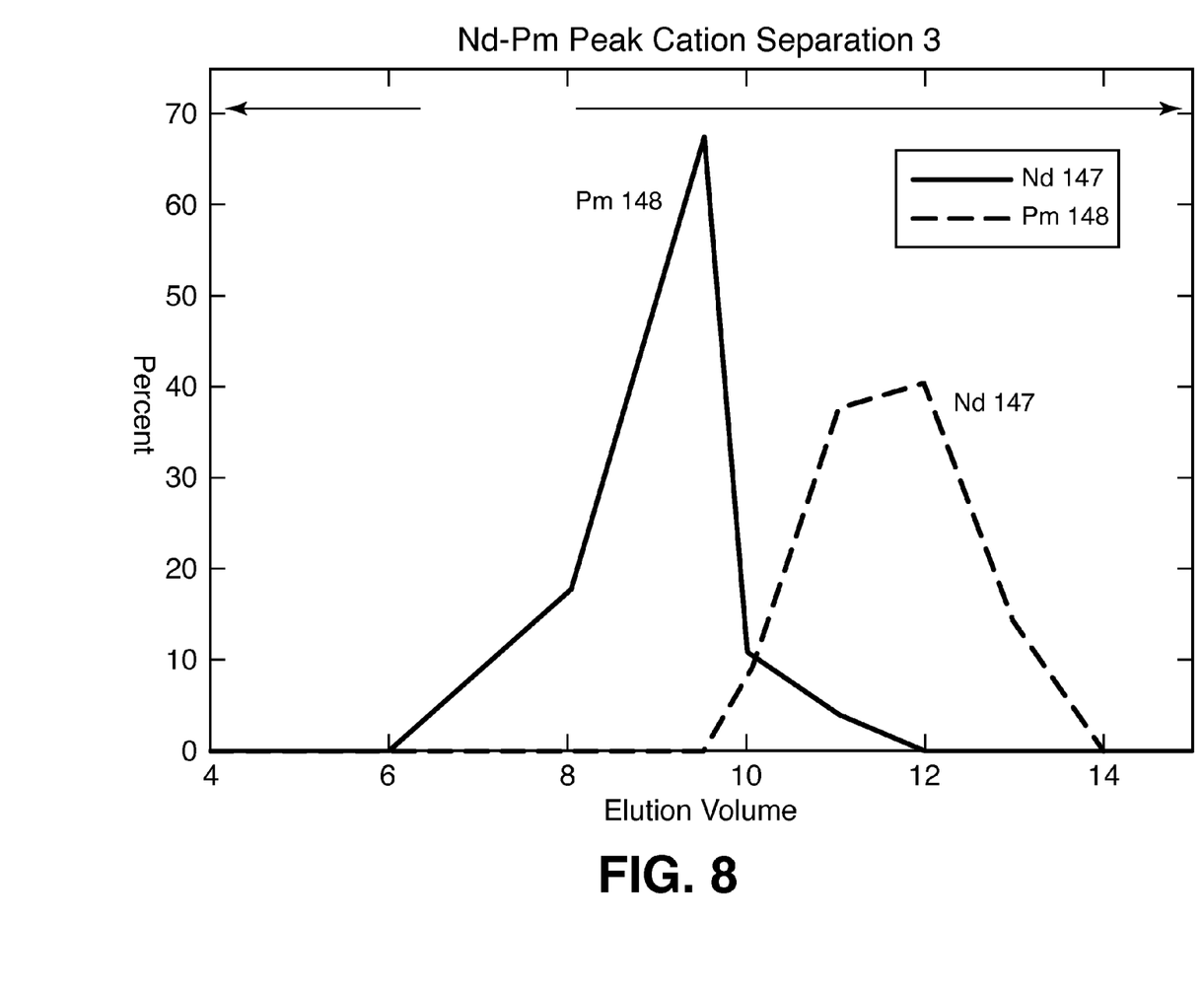
FIG. 8 is a graph showing separation of promethium from neodymium and other radionuclide impurities.
Figure 9:
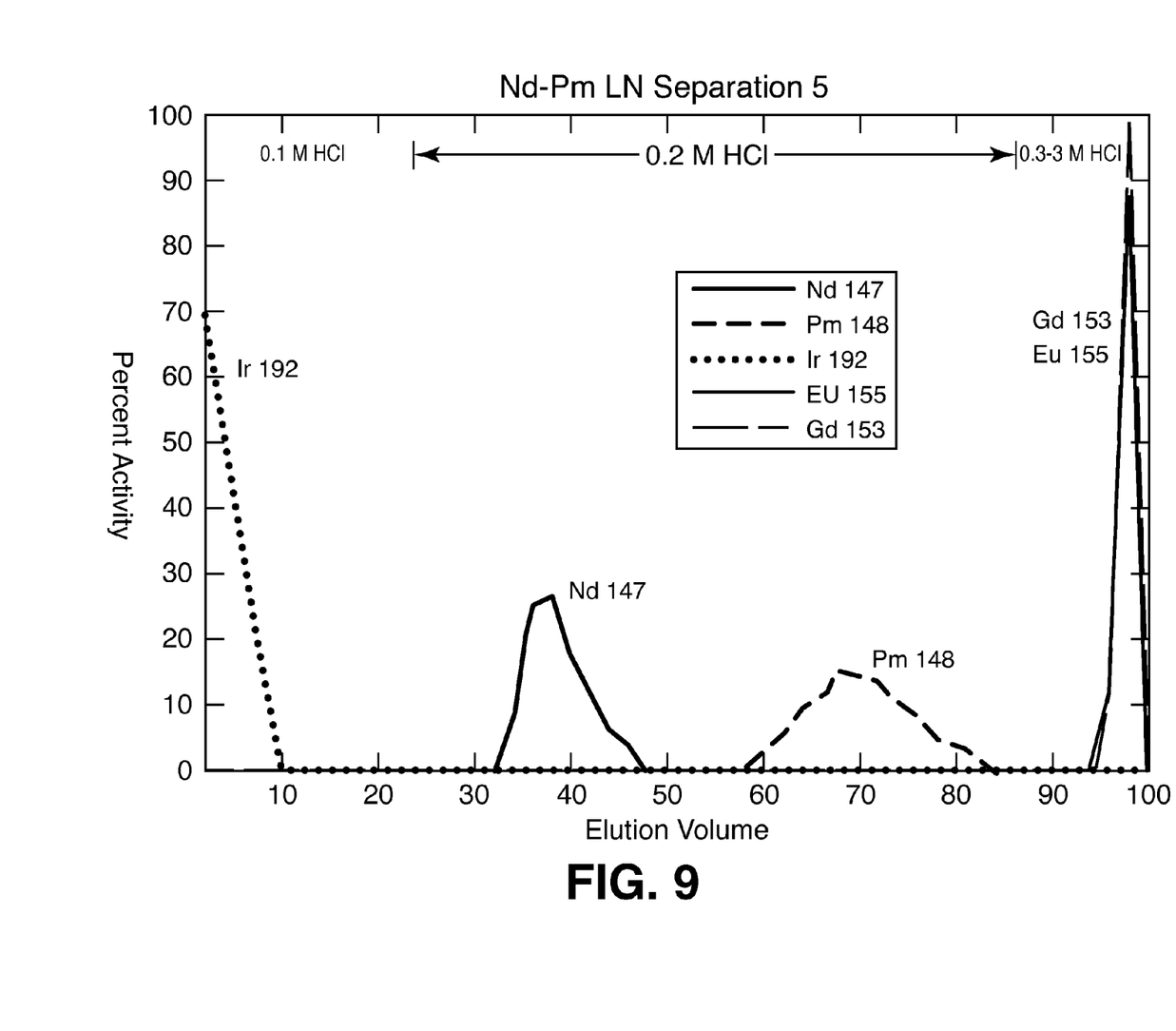
FIG. 9 is a graph showing separation of promethium from neodymium and other radionuclide impurities.
Figure 10:
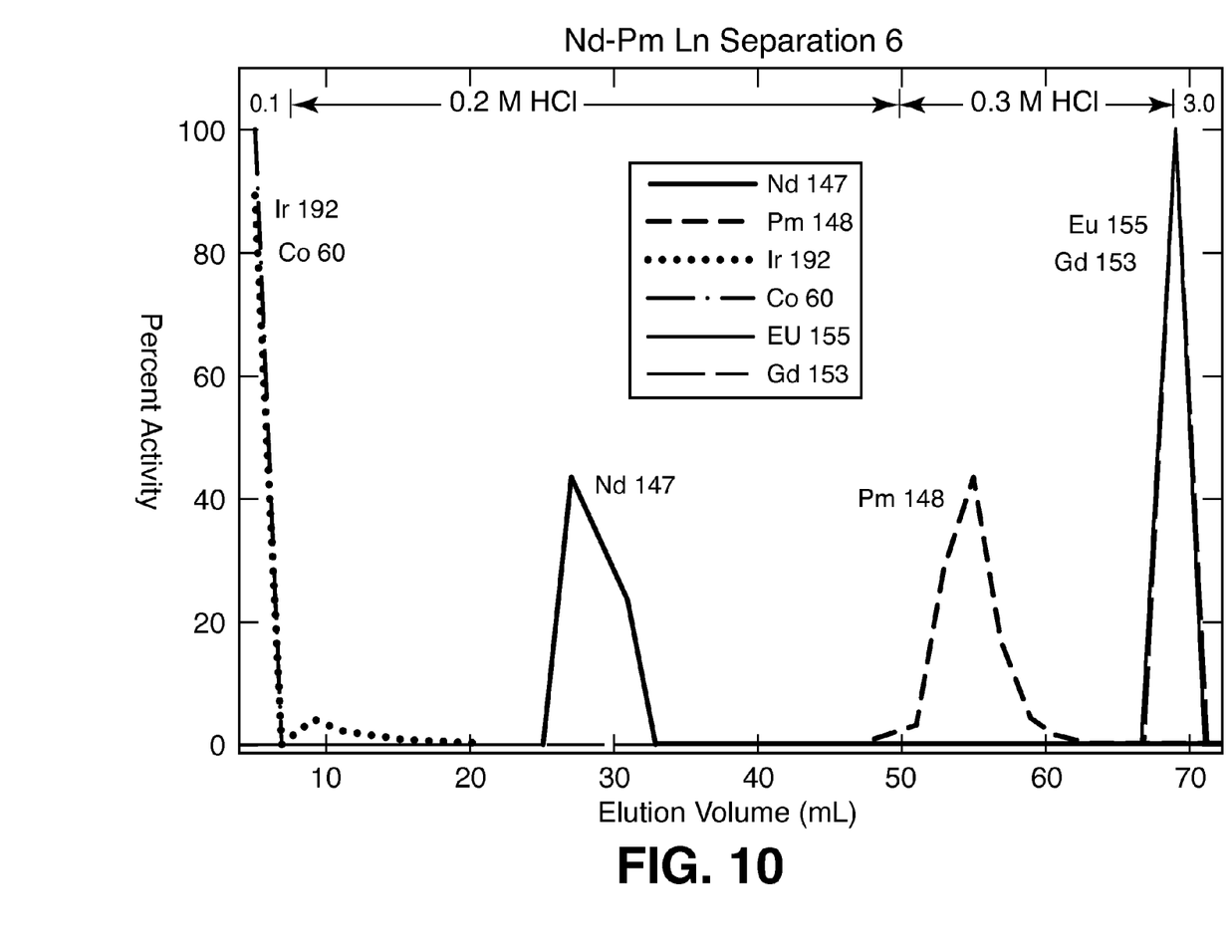
FIG. 10 is a graph showing separation of promethium from neodymium and other radionuclide impurities.

| Experiment | Eluant | Comment |
|---|---|---|
| Column 1 - FIG. 3 | 0.1 M→3 M HCl | Excellent Pm/Nd Separation with extensive 0.1 M HCl fractions |
| Column 1 - FIG. 4 Closeup - Pm Peak | 0.3 M HCl | Broad Pm and Nd factions close together when only using 0.3 M HCl |
| Column 2 - FIG. 5 | 0.3 M HCl | Broad Pm and Nd factions close together when only using 0.3 M HCl |
| Column 3 - FIG. 6 | 0.1 M HIBA | Eluate not effective for Pm/Nd separation - overlapping peaks |
| Column 4 - FIG. 7 | 0.1 M HIBA | Separation not optimal |
| Column 4 - FIG. 8 Close up - Pm/Nd Peaks | 0.1 M HIBA | Separation not optimal |
| Column 5 - FIG. 9 | 0.1 M→3 M HCl | Excellent Pm/Nd separation With extensive 0.2 M HCl fractions |
| Column 6 - FIG. 10 | 0.1 M→3 M HCl | Repeat of Column # 5 |

The data provided hereinabove demonstrate that promethium can be readily separated from neodymium. While it has been shown for the first time that microscopic levels of promethium can be very efficiently separated from macroscopic levels of neodymium by extraction chromatography using the HDEHP by elution with increasing concentrations of HCl, the use of reverse phase column chromatography was not a particularly efficient approach. The data show that purification of promethium-147 from neodymium using HCl elution of the HDEHP is an attractive approach that is useful for commercial-scale promethium-147 production as an alternative to recovery of promethium-147 from fission products.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A method of producing and purifying promethium-147 comprising:
   a. irradiating a target material comprising neodymium-146 with neutrons to produce promethium-147 within said irradiated target material;
   b. dissolving said irradiated target material to form an acidic solution;
   c. loading said acidic solution onto an extraction chromatographic separation apparatus containing di(2-ethylhexyl)orthophosphoric acid impregnated solid support; and
   d. eluting said apparatus to chromatographically separate said promethium-147 from said neodymium-146.

2. A method in accordance with claim 1 wherein said acidic solution further comprises HCL.

3. A method in accordance with claim 1 wherein said eluting step is carried out using an eluant solution comprising HCl.

4. A method in accordance with claim 3 wherein the concentration of said HCl is increased during said eluting step.

5. A method of separating promethium from an acidic solution containing promethium and neodymium comprising:
   a. loading said acidic solution onto an extraction chromatographic separation apparatus containing di(2-ethylhexyl)orthophosphoric acid impregnated solid support; and
   b. eluting said apparatus to chromatographically separate said promethium from said neodymium.

6. A method in accordance with claim 5 wherein promethium further comprises promethium-147.

7. A method in accordance with claim 5 wherein neodymium further comprises neodymium-146.

8. A method in accordance with claim 5 wherein said acidic solution further comprises HCL.

9. A method in accordance with claim 5 wherein said eluting step is carried out using an eluant solution comprising HCl.

10. A method in accordance with claim 9 wherein the concentration of said HCl is increased during said eluting step.

* * * * *